United States Patent [19]
Butterworth et al.

[11] Patent Number: 4,879,455
[45] Date of Patent: Nov. 7, 1989

[54] SELF-VERIFYING TRANSACTION CARDS

[76] Inventors: Nathan I. Butterworth, 6840 S. 284 W.; Lynda M. Butterworth, 6806 S. Baldwin, both of West Jordan, Utah 84084

[21] Appl. No.: 745,147

[22] Filed: Jun. 17, 1985

[51] Int. Cl.⁴ .......................... G06K 5/00; G06F 15/30
[52] U.S. Cl. ..................................... 235/280; 235/492; 235/382.5; 902/26
[58] Field of Search ............ 235/379, 380, 382, 382.5, 235/491, 381, 492, 488, 487; 902/26; 340/825.30, 825.32, 825.33

[56] References Cited

U.S. PATENT DOCUMENTS

| | | | |
|---|---|---|---|
| 3,863,050 | 1/1975 | Brugger et al. | 235/380 |
| 4,207,555 | 6/1980 | Trombly | 235/382.5 |
| 4,298,793 | 11/1981 | Melis et al. | 235/492 |
| 4,341,951 | 7/1982 | Benton | 235/379 |
| 4,394,654 | 7/1983 | Hofmann-Cerfontaine | 235/380 |
| 4,463,349 | 7/1984 | Mochida et al. | 340/825.32 |
| 4,498,000 | 2/1985 | Decavele et al. | 234/492 |
| 4,529,870 | 7/1985 | Chaum | 235/380 |
| 4,544,834 | 10/1985 | Newport et al. | 235/380 |
| 4,582,985 | 4/1986 | Löfberg | 235/380 |
| 4,614,861 | 9/1986 | Pavlov et al. | 235/380 |
| 4,758,718 | 7/1988 | Fujisaki et al. | 235/492 |

*Primary Examiner*—Alan Faber
*Assistant Examiner*—Robert A. Weinhardt

[57] ABSTRACT

A transaction or authorization card, such as a credit card, check guarantee card or identification card, includes self-contained devices for verifying that the holder of the card is the owner or authorized user of the card. The verification is made by way of the card itself without any peripheral apparatus such as reader. The card contains data input, memory, analyzer and indicator devices which are all built into and contained integrally in the card. The analyzer is capable of determining whether or not input data corresponds to coded data held in the memory. If the input data does correspond to the coded data, a visual indication of such acceptable status is given by the indicator. If the input data does not correspond to the coded data, a visual indication is given that any transaction involving the card by that card holder should be rejected.

5 Claims, 1 Drawing Sheet

SELF-VERIFYING TRANSACTION CARDS

BACKGROUND OF THE INVENTION

1. Field

The present invention relates to portable transaction cards such as credit cards, check guarantee cards, identification cards, etc, which are of generally conventional size and which have means for verification that the holder of the object is an authorized person who has the right to use them. In particular, the present invention relates to and provides such , i.e., credit cards, check guarantee cards and identification cards, which have a self-contained means for verification purposes, with no external reading apparatus or other peripheral apparatus being necessary for determining whether the holder of the card is indeed authorized to hold and use the card.

2. State of the Art

The use of credit cards, check guarantee cards and identification cards has become almost universal. Transactions using such cards are common daily occurrences in banking as well as other areas such as security and identification. Credit card fraud has reached mammoth proportions due, in large part, to the vulnerability of existing technologies for the avoidance of such fraud. The prior art technologies have generally not been successful for several reasons. The principal reason being that expensive, cumbersome readers and other peripheral equipment have been required in combination with various means employed on the cards for identifying that the card is valid and that the holder of the card is authorized to use the card. The cards, themselves, so called "smart cards", have been expensive to produce and many of the systems which have been proposed for the cards and readers have been unreliable. Because of the expense and the unreliability, these so called "smart cards" have not been used commercially.

Examples of the prior art technology are disclosed in the U.S. Pat. Nos. 3,831,119; 3,972,138; 4,100,689; 4,105,156; 4,408,119; 4,432,567; and 4,434,361. In all these disclosures, some type peripheral apparatus, such as a machine reader, must be used at the point of purchase or other transaction to verify that the holder of the card is authorized to use the card. The various attempts to develop a system for preventing fraudulent use of credit cards itself indicates that a simple, reliable and inexpensive system is indeed desirable. The development of a card or device which would be adapted to provide self-contained means for verifying whether the holder thereof is the owner or is otherwise properly authorized to use the card or device is highly desirable, and such a card or device is provided by the present invention.

3. Objectives

A general objective of the present invention is to provide an object in the form of a card, such as a credit card, check guarantee card or identification card which if lost or stolen cannot be used for fraudulent transactions.

A principal objective of the present invention is to provide a credit card, check guarantee card, or other type identification card which is relatively inexpensive to produce and which has self-contained means for verifying that the holder of the card is authorized to use the card, wherein proper verification can be established without the need of peripheral apparatus separate from the card itself.

SUMMARY OF THE INVENTION

The above objectives are achieved in accordance with the present invention by providing a novel and improved transaction card, such as a credit card, check guarantee card or other identification card, wherein the card incorporates therein self-contained means for verifying that the holder of the card is or is not authorized to use the card. The card itself is capable of performing and indicating the verification without the use of peripheral equipment, readers, or apparatus of any kind. The verification means which is self-contained within the card comprises a built in keyboard for input of numerical data and electronic means contained within the card for interpreting input data from the built in keyboard.

The transaction card of the present invention can serve the purpose of a conventional credit card, with the additional benefit that fraudulent use of the credit card by an unauthorized holder is made essentially impossible inasmuch as the credit card is capable of self-verifying whether the holder of the card is or is not authorized to use the card. When the card is being used to make a purchase, the holder of the card would enter a security code or personal identification number into the card through the built in keyboard on the faceplate of the card. The electronic means which is built into the card anlayzes the input data and compare the data with the correct security code or personal identification number held in the memory of the electronic means. If the data entered into the card by way of the keyboard matches the security code or personal identification number held in the memory of the electronic means, the electronic means is adapted to signify that the entered data is correct and that the holder of the card is authorized to use the card. If the data entered into the card is not correct, that is it does not correspond to the security code or personal identification number, then the electronic means is adapted to signify that the entry was not acceptable and that the holder of the card is not an authorized user. In the latter instance, the person with whom the transaction is being made would refuse to complete the transaction. In a preferred embodiment of the invention, the electronic means incorporated in the card is adapted to illuminate a light source indicating an acceptable condition when the correct security code or personal identification number is entered into the keyboard, and to illuminate a light source indicating an unacceptable or reject condition when an incorrect number is entered into the keyboard. The two light sources are built into the card, and could be colored such that the acceptable condition is indicated by a green light and the unacceptable condition is indicated by a red light. The cashier or other person with whom the transaction is being made would complete the transaction only after the entrance of an acceptable code into the card made in the presence of the cashier or other person.

The card could otherwise have all the attributes of a conventional credit card, and could then be run through the mechanical roller mechanisms used in making a credit sales. Alternatively, the card could be used as a check guarantee and protection card. The card would have the name and checking account number engraved thereon. Once the holder was identified as an authorized user, it would indicate that the checks having the same account number as given on the card were indeed checks properly belonging to and to be used by the holder. If the holder could not enter an acceptable entry into the card, then a person to whom the check was being issued would refuse to accept the check.

The embodiment of the card containing light sources indicating acceptable and unacceptable conditions could be used to verify use in autotellers. The autoteller would simply have to have a photoelectric cell capable of determining whether the acceptable light source on the card was illuminated prior to allowing any further transactions with the autoteller.

Additional objects and features of the invention will become apparent from the following detailed description taken together with the accompanying drawings.

THE DRAWINGS

A preferred embodiment of the present invention representing the best mode presently contemplated of carrying out the invention is illustrated in the accompanying drawings, in which:

FIG. 1 is a front view of a credit card which incorporates the system of the present invention; and FIG. 2 is a block schematic diagram of the electrical circuitry which is built into the card of FIG. 1.

DETAILED DESCRIPTION OF THE ILLUSTRATED EMBODIMENT

Figure 1:
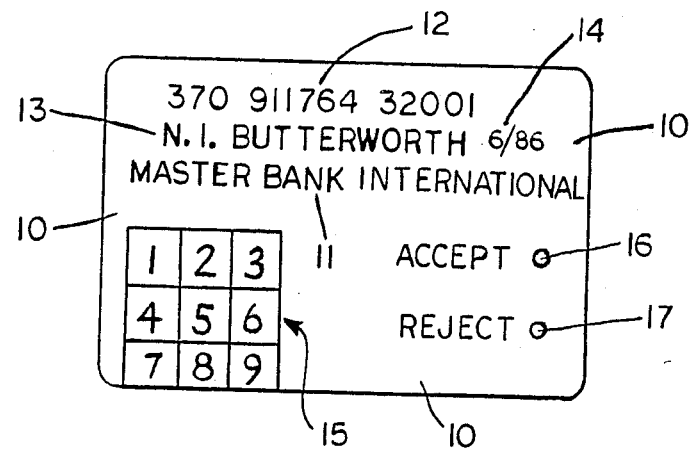

A preferred embodiment of the system of the present invention is shown incorporated into a credit card 10 in FIG. 1. The card 10 is thin, flat and generally rectangular as is customary. The card 10 is imprinted as is known in the art to designate the name of the organization 11 which issued the card; the number 12 of the individual card 10; and the name 13 of the authorized user of the card. In addition the card 10 can be imprinted to show the expiration date 14 of the card, and although not shown explicitly, the card has a line for the authorized user's signature. The signature line can conveniently be on the reverse side of the card. As described thus far, the card is completely conventional and can be used in conventional credit transactions or as a check guarantee card.

The outer appearance of the card 10 of the present invention differs from a conventional credit card primarily in that a keyboard 15 is built into the face of the card and two light sources 16 and 17 which are used to indicate whether the holder is an authorized user of the card and any transaction being pursued is acceptable or whether the holders authorization is questionable and any transaction involving the card should be rejected. The light sources 16 and 17 are preferably light emitting diodes which are embedded within and form part of the plastic credit card 10. Advantageously, the light emitting diode 16 indicating an acceptable transaction is colored green, and the light emitting diode 17 indicating that any attempted transaction should be rejected is colored red.

The keyboard 15 comprises a set of membrane switches built into the face of the card 10. The membrane switches have recently become available and they can be formed right in the face of the card. As illustrated, there are nine switches in the face of the card 10, with the respective switches corresponding to the digits 1 through 9. Although a zero digit switch could be provided, it has been found that the nine digits 1 through 9 are entirely sufficient.

Although not visible from the face of the card 10, electronic circuitry is built into the card 10. The electronic circuitry in combination with the keyboard 15 is capable of verifying whether the holder of the card 10 is or is not authorized to use the card 10. The electronic circuitry is adapted to compare a numerical input such as a security code number or personal identification number entered on the keyboard 15 with the correct code which is retained in the memory of the electronic circuitry. If the entered data corresponds to the correct code, the circuitry is further adapted to signify that the entry was acceptable, and if the entered data does not correspond to the correct code, the circuitry signifies that the entry was incorrect and that the use of the card for any transaction should be rejected. With respect to the illustrated embodiment, if the entered data is correct, the green light source 16 signifying an acceptable entry will be illuminated, and if an incorrect entry is made, the red light source 17 will be illuminated, signifying that any transaction involving the card should be rejected.

Figure 2:
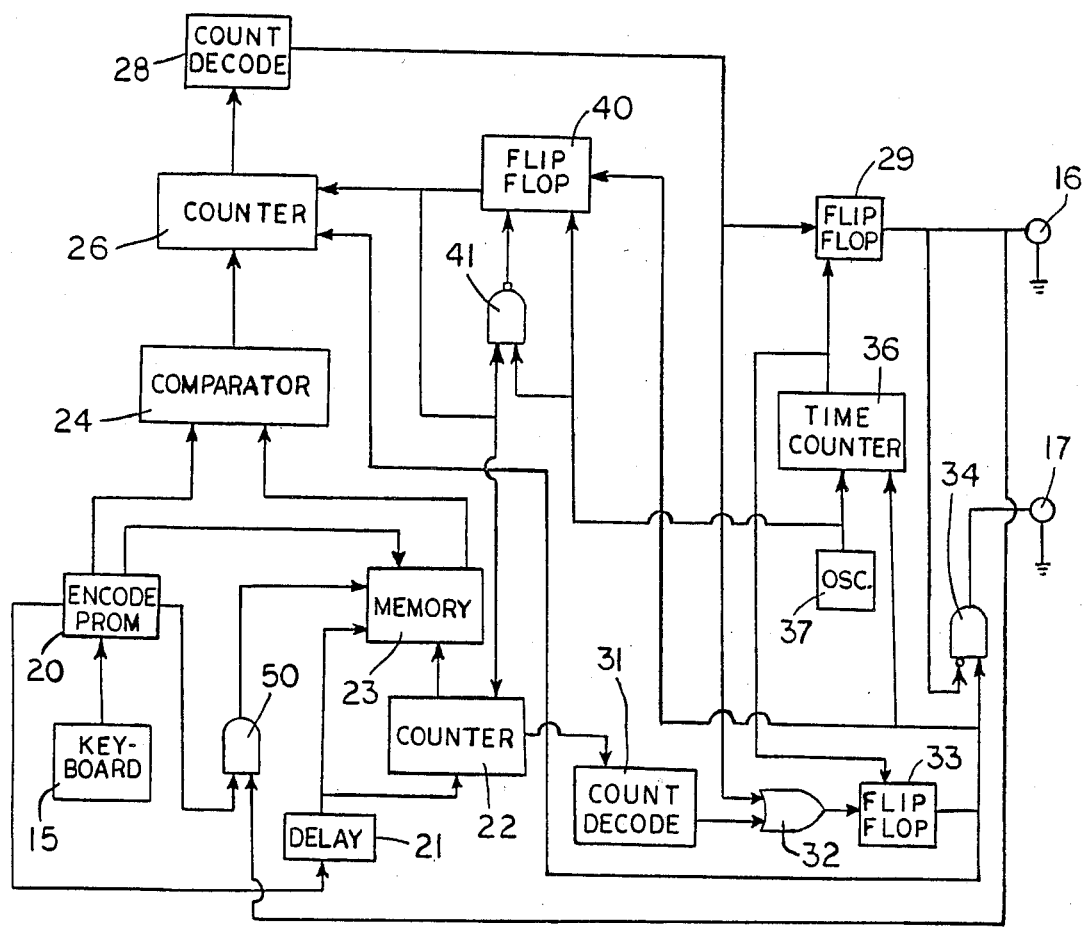

A schematic, block diagram of one preferred embodiment of electrical circuitry which can be used is given in FIG. 2. It should be realized that numerous other circuits could be designed by those skilled in the art and the circuitry shown is given for illustration only.

The security code or personal identification number is entered through the keyboard 15. The code or number can be of any number of digits, but it has been found that a five digit number is advantageous. The five digits can be readily memorized by the authorized user or owner of the card, and the five digit number allows a sufficiently large number of possible combinations that it is highly unlikely that a person not knowing the code number could, within any reasonable period of time, determine the correct code from a systematic entry of all the possible combinations.

Each digit which is entered on the keyboard 15 results in a signal being sent to the encode prom 20. The encode prom 20 forwards a signal to a debounce delay 21. The debounce delay 21, as well known in the art, verifies a valid key entry and prevents multiple entries which could otherwise occur during the making and breaking of the keyboard switch during the entry of the digit into the keyboard 15. The signal is then forwarded from the debounce delay 21 to counter 22 and memory 23.

Irrespective of which digit has been entered on the keyboard 15, the counter 22 will be clocked by that entry. The entry activates the memory 23 to forward both the entered digit and the corresponding digit in the memory 23 to comparator 24. The signal of each keyboard entry also clocks the memory 23 such that the next subsequent keyboard entry will activate the memory 23 to send the activating signal and the next corresponding digit in the memory 23 to the comparator 24. Thus, as a correct five digit code number is entered into the keyboard 15, the comparator 24 will receive five distinct pairs of signals. When the comparator 24 receives a pair of signals which are identical, it forwards a corresponding signal to counter 26. Upon receiving the fifth pair of correctly matched or comparable signals, the comparator 24 will have then sent five signals to the counter 26, and the counter 26 will have been clocked five times by those signals.

The count decode 28, upon detecting the fifth clocking of the counter 26, forwards a signal to the flip flop 29 which in turn activates the green colored, light emitting diode 16. The diode 16 shows on the face of the card that an acceptable entry has been made, and thus indicates that the person who made the correct entry is authorized to use the card.

If a series of incorrect digits are entered into the keyboard 15, each entry will clock the counter 22 even though the entry does not compare with the proper digit from the memory 23. Thus for each digit entered, the counter 22 is clocked, but counter 26 is clocked only by a digit which compares with the proper digit in the memory 23. Upon entry of five digits, the counter 22 will have been clocked five times. If of those five digits, two were comparable with corresponding digits in the memory, counter 26 would have been clocked twice. At this point, neither the accept diode 16 or the reject diode 17 will have been illuminated. Upon entry of the sixth digit into the keyboard 15, the counter 22 will be clocked, and the count decode 31, upon detecting the sixth clocking of the counter 22, sends a signal to the or gate 32. The or gate 32 then signals the flip flop 33 which in turn sends a signal to the and gate 34. The other input to the and gate 34 comes from the output of flip flop 29 which activates the diode 16. When there has been no signal from count decode 28 to flip flop 29, the diode 16 is not illuminated, and the signal to the and gate 34 is negative. The and gate 34 is adapted to invert the signal from flip flop 29, and thus when the signal from flip flop 33 arrives at the and gate 34, an activating signal is sent to the red diode 17. Because of the inverted signal which is sent to the and gate 34, it can be seen that if the diode 16 is activated, the diode 17 cannot be illuminated. When the flip flop 33 is turned on so as to send a signal to and gate 34, it also is wired so as to send a disable signal to the counter 26. Thus, when the red diode 17 is illuminated, the circuitry leading to the green diode 16 is disabled, and whenever the red diode 17 is activated, the green diode 16 cannot be illuminated.

A timer and one shot system are provided for resetting the two counters 22 and 26 after a set time following either the illumination of the accept diode 16 or the reject diode 17. Resetting counter 22 also resets the memory 23 so that it will cycle through the proper issuance of digits in the memory as it is clocked by the signals coming from the keyboard 15. The timer comprises a time counter 36 and an oscillator 37 which is connected to the time counter 36. The time counter 36 is activated whenever either of the diodes 16 or 17 is illuminated. The signal from flip flop 33 is forwarded to the time counter 36 to start the timer. The time counter 36 is set to time out a given time and then to send a signal to the flip flops 29 and 30 thereby reset those flip flops. The signal which initiated the time counter 36 is also sent to flip flop 40, which in combination with and gate 41, acts as a one shot. When activated, the flip flop 40 sends a signal to the counters 22 and 26 which resets those counters.

The timer and one shot circuits are activated whenever an output signal is generated by flip flop 33. Thus, it can be seen that the timer and one shot circuits are activated whenever an improper entry is made and the red reject diode 17 is illuminated inasmuch as the output from the flip flop 33 initiates the illumination of the rejected diode 17 through the inverting and gate 34. To activate the timer and one shot circuitry after a correct entry of the security code or personal identification number on the keyboard 15 has illuminated the accept diode 16, the signal from count decode 28 is sent to the or gate 32. This activates the flip flop 33 but will not result in the illumination of the red diode 17 inasmuch as the inverted signal from the flip flop 19 inactivates the and gate 34 which controls the red diode 17. However, the signal from the flip flop 33 does activate the timer and one shot circuits. As can be seen, whenever either of the diodes 16 or 17 are illuminated, the time counter 36 will effectively keep the particular diode illuminated for a preset time, that is, the time duration that the time counter 36 times out. The flip flop will have immediately reset the counters 22 and 26, and when the time counter times out, the flip flops 29 and 33 are reset, the diode is turned off, and the card is ready for another cycle of operation.

When the card 10 is to be used for a transaction, it is preferable for the holder of the card to enter six random numbers on the keyboard 15 to show the clerk or person with whom the transaction is being made that the card is operative and that the card will show an unacceptable condition when the improper entries are made to the keyboard 15. This also resets the electrical circuitry in the card so that it is in the proper state to accept the next five digits and turn the accept diode 16 on when the correct five digits are entered on the keyboard 15.

The circuitry contained in the card 10 can also be provided with means whereby the owner of the card can change the security code or personal identification number in the memory 23 at any time. This would allow the owner of the card to change the code at any time that it was suspected that an unauthorized person had possibly become aware of the old code. The owner could, if so desired, periodically change the security code.

The circuitry necessary to allow reprogramming of the memory is quite simple. It comprises an and gate 50 which is connected to the accept diode 16 and the encode prom 20. To change the code in the memory, the old code must be entered from the keyboard 15 so as to illuminate the accept diode 16. A particular preset key on the keyboard 15, such as the number 9, would be depressed. The encode prom 20 is adapted to sense this latter entry on the keyboard 15 and sends the second signal to the and gate 50. The and gate 50 would then signal the memory 23 so as to clear the memory and reset it so that it can be programmed with a new security code. The new security code would be entered into the memory 23 from the keyboard 15. This entry must be made during the time that the accept diode 16 is illuminated. As soon as the time counter times out and the accept diode is turned off, the card is ready for reuse using the new security code. As initially manufactured, the memory 23 could be set for all digits to be a particular digit, such as one, so that to initiate the accept diode 16, that digit would be depressed five times on the keyboard 15. Upon the entry of the five digits, the memory could then be programmed with the desired security code or personal identification number as explained above.

A battery source (not shown in the drawings) is supplied within the card 10 to provide the necessary energy necessary for the operation of the electrical circuitry and the diodes. The numerous connections between the battery and the components in the circuitry are not shown inasmuch such connections are well within the skill of these artisans in the field and are not needed to describe the operation of the circuitry.

It is to be understood that the present disclosure, including the detailed description of the illustrated embodiment, is made by way of example and that various other embodiments are possible without departing from the subject matter coming within the scope of the following claims, which subject matter is regarded as the invention.

We claim:

1. A transaction or authorization card, such as a credit card, check guarantee card or identification card, said card comprising:

data input means which is built into the card as a self-contained integral component card, said data input means being adapted to generate data by manual manipulation thereof by a holder of the card;

memory means which is also built into the card as a self-contained integral component of the card, said memory means being adapted to be programmed with and store security coded data;

programming means included in said card as a self-contained integral component of the card for the holder of the card to (1) initially enter said coded data into said memory means and (2) to enter replacement coded data for existing coded data at any time, wherein following the initial entry of said coded data, said programming means is activated only by entry of the existing coded data and a coded request for entering replacement coded data;

analyzer means which is also built into the card as a self-contained integral component of the card, said analyzer means being adapted to receive data generated by said data input means and for comparing the data from said input means with the coded data held in said memory means; and indicator means which is also built into the card as self-contained integral component of said card and which is associated with said analyzer means, said indicator means being adapted to give a visual indication of acceptable use of said card when the analyzer means determines that the data which has been manually entered through said data input means by the holder of said card is the same as the coded data held in said memory of said card, said indicator means further adapted to give a visual indication to reject use of the card when the analyzer means determines that the data which has been manually entered through said data input means by the holder of said card is not the same as the coded data held in said memory means of said card.

2. A transaction or authorization card in accordance with claim 1, wherein the data input means comprises a keyboard which is built into one face of the card.

3. A transaction or authorization card in accordance with claim 2, wherein the keyboard contains a plurality of keys corresponding to mutually respective, different numerical digits; and the memory means is programmed with a coded data comprising a particular sequence of numerical digits.

4. A transaction or authorization card in accordance with claim 2, wherein the indicator means includes a pair of visual indicators capable of emitting light, said indicator means further including means for (1) causing one of said indicators to emit light when the analyzer means determines that the data entered manually through said keyboard is the same as the coded data held in said memory means of said card, and (2) causing the other of said indicators to emit light when the analyzer means determines that the data entered manually through said keyboard is not the same as the coded data held in said memory means of said card.

5. A transaction or authorization card in accordance with claim 4, wherein the visual indicators are light emitting diodes.

* * * * *